(12) United States Patent
Sim

(10) Patent No.: US 9,035,591 B2
(45) Date of Patent: May 19, 2015

(54) CONTROL METHOD OF ELECTRONIC PARKING BRAKE SYSTEM

(75) Inventor: Gyung Hun Sim, Gyeonggi-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 94 days.

(21) Appl. No.: 13/493,376

(22) Filed: Jun. 11, 2012

(65) Prior Publication Data

US 2013/0002181 A1    Jan. 3, 2013

(30) Foreign Application Priority Data

Jun. 28, 2011 (KR) .................. 10-2011-0062624

(51) Int. Cl.
| | |
|---|---|
| *H02P 1/04* | (2006.01) |
| *B60T 13/00* | (2006.01) |
| *B60T 13/66* | (2006.01) |
| *B60T 13/74* | (2006.01) |
| *F16D 65/12* | (2006.01) |
| *F16D 66/00* | (2006.01) |
| *F16D 121/24* | (2012.01) |
| *F16D 125/40* | (2012.01) |
| *F16D 125/48* | (2012.01) |

(52) U.S. Cl.
CPC ............ *B60T 13/662* (2013.01); *B60T 13/741* (2013.01); *F16D 65/12* (2013.01); *F16D 2066/005* (2013.01); *F16D 2121/24* (2013.01); *F16D 2125/40* (2013.01); *F16D 2125/48* (2013.01)

(58) Field of Classification Search
CPC .......... B60T 7/107; B60T 7/12; B60T 7/085; B60T 13/74; B60T 7/124; B60T 7/128; B60T 7/14; B60T 8/88; B60T 8/92; B60T 8/96; B60T 8/885

USPC .................................................. 318/362, 368
See application file for complete search history.

(56) References Cited

U.S. PATENT DOCUMENTS

| | | | |
|---|---|---|---|
| 6,206,482 B1* | 3/2001 | Campau et al. ................. | 303/20 |
| 6,402,260 B1* | 6/2002 | Kobayashi et al. ............. | 303/20 |
| 6,749,269 B1* | 6/2004 | Niwa ............................... | 303/20 |
| 2004/0026989 A1* | 2/2004 | Suzuki et al. ................... | 303/89 |
| 2004/0090112 A1* | 5/2004 | Tachiiri et al. .................. | 303/20 |

(Continued)

FOREIGN PATENT DOCUMENTS

| | | |
|---|---|---|
| DE | 10 2004 059 688 A1 | 6/2006 |
| DE | 10 2005 051 521 A1 | 6/2006 |

(Continued)

OTHER PUBLICATIONS

Chinese Office Action issued in Chinese Application No. 201210210590.1 dated Mar. 31, 2014, w/English translation.

(Continued)

*Primary Examiner* — Paul Ip
*Assistant Examiner* — Devon Joseph
(74) *Attorney, Agent, or Firm* — McDermott Will & Emery LLP

(57) ABSTRACT

Disclosed is a control method of an electronic parking brake system, which variably controls the duty of voltage applied to a motor upon release of the electronic parking brake system. The control method includes controlling voltage applied to a motor to a first duty ratio upon release of the electronic parking brake system, controlling the voltage applied to the motor to a second duty ratio greater than the first duty ratio if locking of the motor occurs and the motor is not operated, and controlling the voltage applied to the motor to the first duty ratio if locking of the motor is released and the motor begins to operate, after the control of voltage to the second duty ratio.

9 Claims, 4 Drawing Sheets

(56) References Cited

U.S. PATENT DOCUMENTS

| | | | |
|---|---|---|---|
| 2005/0046271 A1* | 3/2005 | Suzuki et al. | 303/20 |
| 2006/0108956 A1* | 5/2006 | Clark et al. | 318/139 |
| 2007/0188015 A1* | 8/2007 | Sato et al. | 303/11 |
| 2008/0086253 A1* | 4/2008 | Nakayama | 701/80 |
| 2009/0099748 A1* | 4/2009 | Watanabe et al. | 701/70 |
| 2010/0204894 A1* | 8/2010 | Strengert et al. | 701/70 |

FOREIGN PATENT DOCUMENTS

| | | |
|---|---|---|
| JP | 08-295225 | 11/1996 |
| JP | 2009-012497 | 1/2009 |
| KR | 2010-0121902 A | 11/2010 |

OTHER PUBLICATIONS

German Office Action issued in German Application No. 10 2012 010 630.0 dated Jul. 8, 2013.

Korean Office Action issued in Korean Patent Application No. 10-2011-0062624 dated Aug. 7, 2012.

* cited by examiner

CONTROL METHOD OF ELECTRONIC PARKING BRAKE SYSTEM

CROSS-REFERENCE TO RELATED APPLICATION

This application claims the benefit of Korean Patent Application No. 2011-0062624, filed on Jun. 28, 2011 in the Korean Intellectual Property Office, the disclosure of which is incorporated herein by reference.

BACKGROUND

1. Field

Embodiments of the present invention relate to a control method of an electronic parking brake system, which may reduce noise generated during actuation of an electronic parking brake.

2. Description of the Related Art

Generally, a brake system includes a parking brake, which is normally referred to as a hand brake or a side brake to keep a vehicle stationary. The parking brake is actuated as a driver operates a parking lever provided at one side of a driver's seat within a vehicle. If the driver pulls the parking lever, a cable connected to the parking lever is pulled, serving to keep a rear wheel brake assembly connected to the cable in an operated state. In this way, brake force is generated. On the contrary, the cable is released when the parking lever is released, which releases the brake force.

The above-described actuation of the parking brake using the parking lever requires the driver to directly operate the parking lever. If the driver parks a vehicle without pulling the parking lever by mistake, the vehicle may unintentionally move, e.g., on an incline, causing unexpected accidents. Further, operating the parking lever whenever parking a vehicle or initiating vehicle traveling may make use troublesome.

For this reason, an Electronic Parking Brake (hereinafter referred to as EPB) has been developed to electronically control actuation of the parking brake. The EPB is a system to automatically apply or release the parking brake via a simplified switching operation. Even if the driver does not manually operate the parking brake, the EPB is automatically actuated to keep a vehicle parked or stationary in the case of a vehicle stop or if there is a risk of a vehicle moving backward when started on an incline.

The EPB system provides a variety of functions, such as, for example, automatic coupling of the parking brake upon emergency braking and engine stop, and anti-slip on an incline. Moreover, the EPB system has a Drive Away Release (DAR) function that causes the parking brake to be automatically released if the driver pushes an accelerator pedal in a state in which the parking brake has been applied. In the case in which a vehicle, which is provided with the EPB system having the DAR function, restarts on flat ground or downhill after the parking brake has been applied, the parking brake is automatically released as the accelerator pedal is simply pushed without requiring operation of a separate release button, assisting in conveniently driving the vehicle.

The EPB system may be one of cable puller, motor-on-caliper, and hydraulic parking brake types.

Most vehicular systems are operated via engagement between a motor and a gear and generate noise during operation. In particular, in the case of a luxury vehicle, a greater number of electric parts are mounted, and therefore it is important to reduce noise generated during operation of the electric elements. Moreover, since the EPB system is actuated while the vehicle stops, the driver may feel that the EPB system is noisier than other devices.

SUMMARY

Therefore, it is an aspect of the present invention to provide a control method of an electronic parking brake system, which variably controls the duty of voltage applied to a motor upon release of the electronic parking brake system.

Additional aspects of the invention will be set forth in part in the description which follows and, in part, will be obvious from the description, or may be learned by practice of the invention.

In accordance with one aspect of the present invention, a control method of an electronic parking brake system includes controlling voltage applied to a motor to a first duty ratio upon release of the electronic parking brake system, controlling the voltage applied to the motor to a second duty ratio greater than the first duty ratio if locking of the motor occurs and the motor is not operated, and again controlling the voltage applied to the motor to the first duty ratio if locking of the motor is released and the motor begins to operate, after the control of voltage to the second duty ratio.

The first duty ratio may be in a range of about 50%~80%.

The second duty ratio may be in a range of about 90%~100%.

In accordance with another aspect of the present invention, a control method of an electronic parking brake system includes controlling voltage applied to a motor to a duty ratio of about 50%~80% upon release of the electronic parking brake system, judging whether or not locking of the motor occurs after the control of voltage applied to the motor to the duty ratio of about 50%~80%, controlling the voltage applied to the motor to a duty ratio of about 90%~100% if locking of the motor occurs, judging whether or not locking of the motor is released after the control of voltage applied to the motor to the duty ratio of about 90%~100%, and controlling the voltage applied to the motor to the duty ratio of about 50%~80% if locking of the motor is released.

The judging whether or not locking of the motor occurs may include judging that locking of the motor occurs if current is no longer increased and is maintained at a predetermined value after the control of voltage applied to the motor to the duty ratio of about 50%~80%.

The judging whether or not locking of the motor occurs may include judging whether or not locking of the motor occurs using an encoder or a hall sensor.

The judging whether or not locking of the motor is released may include judging that locking of the motor is released if current is reduced after the control of voltage applied to the motor to the duty ratio of about 90%~100%.

The judging whether or not locking of the motor is released may include judging whether or not locking of the motor is released using an encoder or a hall sensor.

In accordance with a further aspect of the present invention, a control method of an electronic parking brake system to reduce noise of the electronic parking brake system includes controlling voltage applied to a motor to a duty ratio of about 50%~80% during a release operation of the electronic parking brake system, and controlling the voltage applied to the motor to a duty ratio of about 100% if locking of the motor occurs.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
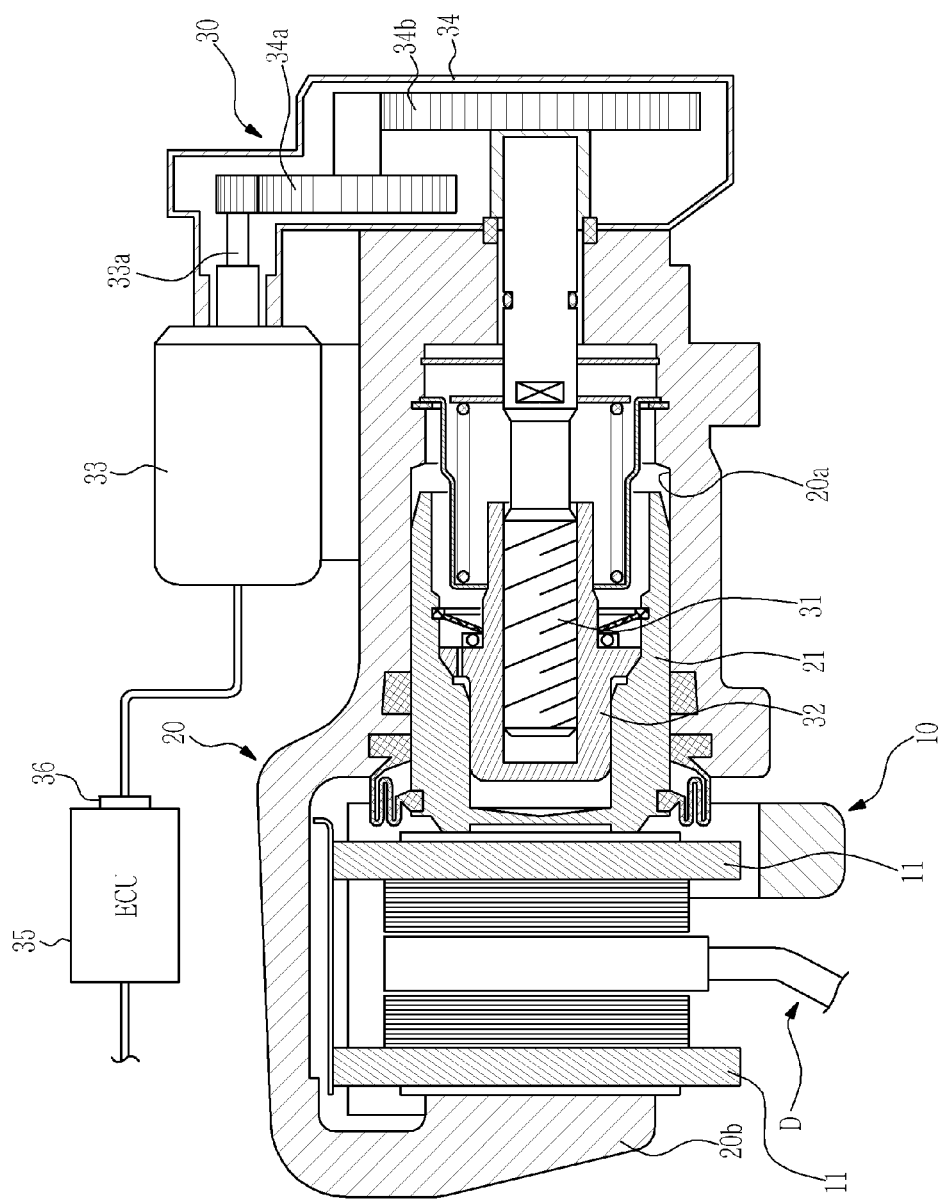
FIG. 1 is a view illustrating a disc brake used in an electronic parking brake system according to an exemplary embodiment of the present invention.

Reference will now be made in detail to the embodiment of the present invention, examples of which are illustrated in the accompanying drawings, wherein like reference numerals refer to like elements throughout.

FIG. 1 is a view illustrating a disc brake used in an electronic parking brake system according to an exemplary embodiment of the present invention. Here, the electronic parking brake system is of motor-on-caliper type.

The disc brake having the function of the electronic parking brake system includes a carrier 10 coupled to a vehicle body, and a caliper housing 20 reciprocally movably coupled to the carrier 10. The carrier 10 receives a pair of frictional pads 11 spaced apart from each other by a predetermined distance. The caliper housing 20 includes a cylinder portion 20a, in which a piston 21 is reciprocally movably installed to press the two frictional pads 11 against a disc D, and a finger portion 20b provided at an opposite side of the cylinder portion 20a.

The disc brake further includes an electronic parking brake system 30 to function as a parking brake. The electronic parking brake system 30 includes an actuating shaft 31 rotatably installed in the cylinder portion 20a of the caliper housing 20, a pressure sleeve 32 fitted inside the piston 21 to be reciprocally moved by rotation of the actuating shaft 31 so as to press or release the piston 21, an electric motor 33 to rotate the actuating shaft 31, and a deceleration gear assembly 34 including a plurality of gears 34a and 34b to transmit power generated from a rotating shaft 33a of the electric motor 33 to the actuating shaft 31 at reduced revolutions per minute.

The electronic parking brake system 30 further includes an Electronic Control Unit (ECU) 35 to control the entire system, and a current sensor 36 installed to the ECU 35 to measure current to be applied to the electric motor 33.

Next, a braking operation of the electronic parking brake system will be described.

If the driver operates a switch (not shown) for parking, the electric motor 33 begins to rotate. Revolutions per minute of the electric motor 33 are reduced by the decelerator 34, causing the actuating shaft 31 to rotate with great force. Through rotation of the actuating shaft 31, the pressure sleeve 32 is axially moved to press the piston 21 of the pressure sleeve 32, realizing vehicle braking.

Figure 2:
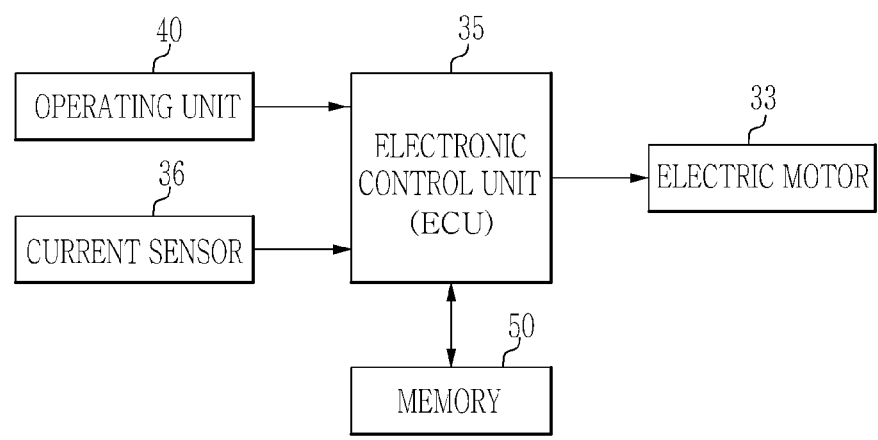
FIG. 2 is a control block diagram of the electronic parking brake system according to the exemplary embodiment of the present invention.

FIG. 2 is a control block diagram of the electronic parking brake system according to the exemplary embodiment of the present invention.

The electronic parking brake system includes the ECU 35, a memory 50, the current sensor 36, an operating unit 40 to receive a control signal for realization of parking, and the electric motor 33.

The ECU 35 confirms current applied to the motor 33 and voltage of a battery (not shown) when the electronic parking brake system is applied or released. The battery is connected to the electric motor 33 and the ECU 35 in parallel, and therefore the battery voltage is equal to voltage applied to the electric motor 33 and voltage applied to the ECU 35. Meanwhile, the ECU 35 receives information on current applied to the electric motor 33 from the current sensor 36, and monitors the battery voltage based on the voltage applied to the ECU 35 in real time (an AD value is continuously input to the ECU 35).

The ECU 35 calculates power using the current applied to the motor 33 when the electronic parking brake is applied or released and the battery voltage (P=I*V).

The current sensor 36 senses the current applied to the electric motor 33. Referring to FIG. 1, since the current is applied to the electric motor 33 through the ECU 35, the current sensor 36 may be installed to an interior position or an output terminal of the ECU 35.

The electric motor 33 is rotated forward or in reserve upon receiving a signal of the ECU 35. When the electric motor 33 is rotated, the actuating shaft 31 shown in FIG. 1 is rotated in the same direction as the electric motor 33, serving to press or release the piston 21.

Figure 3:
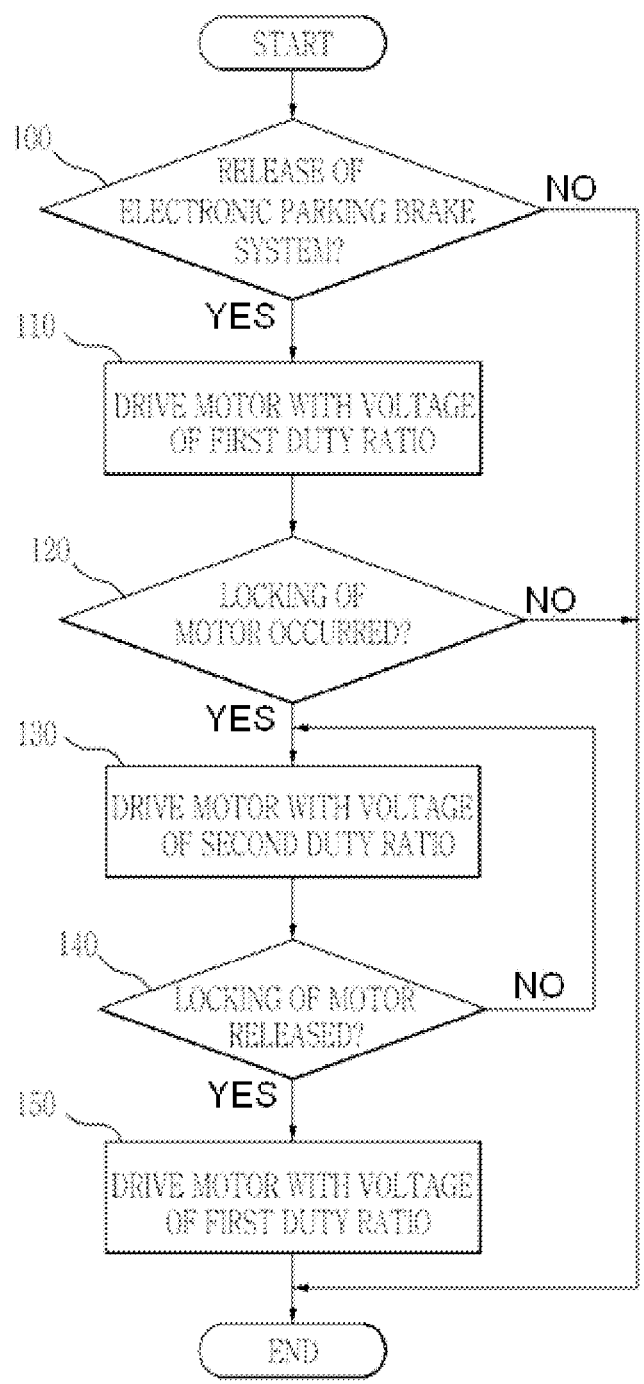
FIG. 3 is a flowchart illustrating a control method of the electronic parking brake system according to the exemplary embodiment of the present invention.

FIG. 3 is a flowchart illustrating a control method of the electronic parking brake system according to the exemplary embodiment of the present invention.

If the electronic parking brake system 30 begins a release operation, the ECU 35 controls voltage applied to the electric motor 33 to a first duty ratio, rotating the electric motor 33 in reverse (110). The first duty ratio corresponds to a duty ratio of 50% to 80%, and may be a duty ratio of 75%, although the disclosure is not limited thereto. If voltage applied to the electric motor 33 is controlled to the first duty ratio of 50% to 80% for the release operation of the electronic parking brake system 30, current instantly increases (section (a) of FIG. 4).

Next, the ECU 35 judges whether or not locking of the electric motor 33 occurs (120). If locking of the electric motor 33 occurs, it may be necessary to rotate the electric motor 33 to the maximum torque to unlock the electric motor 33. Therefore, current applied to the electric motor 33 is maintained at the maximum value (section (a) of FIG. 4). Accordingly, the ECU 35 judges that locking of the electric motor 33 occurs if the current applied to the electric motor 33 is maintained at the maximum value. Alternatively, in the case in which an encoder (not shown) is mounted to the electric motor 33, the encoder senses whether or not the electric motor 33 is locked, and transmits a sensing signal to the ECU 35. In this way, the ECU 35 may judge whether or not the electric motor 33 is locked based on the signal transmitted from the encoder. Alternatively, a hall sensor may be used to sense whether or not the electric motor 33 is locked.

Next, after judging that locking of the electric motor 33 occurs, the ECU 35 controls the voltage applied to the electric motor 33 to a second duty ratio (130). The second duty ratio corresponds to a duty ratio of 90% to 100%, and may be a duty ratio of 100%, although the disclosure is not limited thereto. It may be necessary to rotate the electric motor 33 to the maximum torque to release locking of the electric motor 33. Since the torque is proportional to current, the electric motor 33 is rotated by controlling the voltage applied to the electric motor 33 to the duty ratio of 100% (section (b) of FIG. 4). When rotating the electric motor 33 at the controlled second duty ratio, the current applied to the electric motor 33 may be greater than that when rotating the electric motor 33 at the controlled first duty ratio.

Next, the ECU 35 judges whether or not locking of the electric motor 33 is released (140). If locking of the electric motor 33 is released, the electronic parking brake system 30 is released, causing current reduction (section (c) of FIG. 4). Accordingly, the ECU 35 judges that locking of the electric motor 33 is released if current is reduced. Alternatively, in the case in which an encoder (not shown) is mounted to the electric motor 33, the encoder senses whether or not locking of the electric motor 33 is released, and transmits a sensing signal to the ECU 35. In this way, the ECU 35 may judge whether or not locking of the electric motor 33 is released based on the signal transmitted from the encoder. Alternatively, a hall sensor may be used to sense whether or not locking of the electric motor 33 is released.

Figure 4:
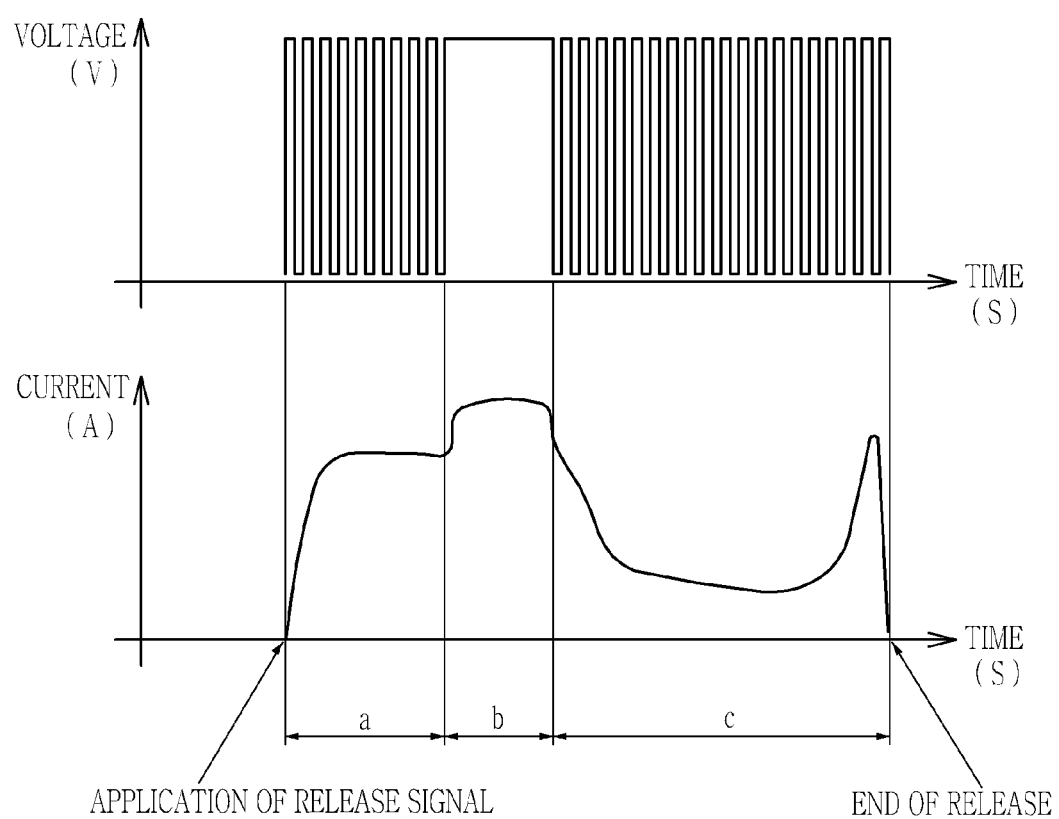
FIG. 4 is a graph illustrating duty control of the electronic parking brake system according to the exemplary embodiment of the present invention.

Next, after judging that locking of the electric motor 33 is released, the ECU 35 controls the voltage applied to the electric motor 33 to the first duty ratio to rotate the electric motor 33 (150) (section (c) of FIG. 4).

Once the electronic parking brake system has initiated application, maximum force may be required to perform normal release thereof. To this end, it may be necessary to control the voltage applied to the electric motor 33 to the duty ratio of 100%. This is not substantially different from an on/off operation. Although the electronic parking brake system may be normally released without locking of the electric motor 33 if the voltage applied to the electric motor 33 is controlled to the duty ratio of 100%, this may cause substantial noise. However, when driving the electric motor 33 at a lower duty ratio than the duty ratio of 100%, for example, at a duty ratio of 75%, the motor may not be operated to the maximum extent although noise may be reduced, which may make it impossible to realize normal release of the electronic parking brake system.

As described above, according to the embodiment of the present invention, the motor is driven at the first duty ratio, more particularly, at the duty ratio of 75% only when locking of the motor occurs. In other cases, the motor is driven at the second duty ratio, more particularly, at the duty ratio of about 100%, which allows the electronic parking brake system to be normally released without locking of the motor and with less noise as compared to driving at the duty ratio of 100%.

As is apparent from the above description, according to the embodiment of the present invention, effective reduction of noise generated from an electronic parking brake system may be accomplished.

Although the embodiment of the present invention has been shown and described, it would be appreciated by those skilled in the art that changes may be made in these embodiments without departing from the principles and spirit of the invention, the scope of which is defined in the claims and their equivalents.

What is claimed is:

1. A control method of an electronic parking brake system, the method comprising:
    determining whether the electronic parking brake system is released;
    controlling voltage applied to a motor to a first duty ratio when the electronic parking brake system is determined to be released;
    controlling the voltage applied to the motor to a second duty ratio greater than the first duty ratio if locking of the motor occurs and the motor is not operated; and
    again controlling the voltage applied to the motor to the first duty ratio if locking of the motor is determined to be released and the motor begins to operate, after controlling the voltage applied to the motor to the second duty ratio.

2. The method according to claim 1, wherein the first duty ratio is in a range of about 50%~80%.

3. The method according to claim 1, wherein the second duty ratio is in a range of about 90%~100%.

4. A control method of an electronic parking brake system, the method comprising:
    determining whether the electronic parking brake system is released;
    controlling voltage applied to a motor to a duty ratio of about 50%~80% when the electronic parking brake system is determined to be released;
    judging whether or not locking of the motor occurs after the control of voltage applied to the motor to the duty ratio of about 50%~80%;
    controlling the voltage applied to the motor to a duty ratio of about 90%~100% if locking of the motor occurs;
    judging whether or not locking of the motor is released after the control of voltage applied to the motor to the duty ratio of about 90%~100%; and
    controlling the voltage applied to the motor to the duty ratio of about 50%~80% if locking of the motor is determined to be released.

5. The method according to claim 4, wherein the judging whether or not locking of the motor occurs includes judging that locking of the motor occurs if current is no longer increased and is maintained at a predetermined value after the control of voltage applied to the motor to the duty ratio of about 50%~80%.

6. The method according to claim 4, wherein the judging whether or not locking of the motor occurs includes judging whether or not locking of the motor occurs using an encoder or a hall sensor.

7. The method according to claim 4, wherein the judging whether or not locking of the motor is released includes judging that locking of the motor is released if current is reduced after the control of voltage applied to the motor to the duty ratio of about 90%~100%.

8. The method according to claim 4, wherein the judging whether or not locking of the motor is released includes judging whether or not locking of the motor is released using an encoder or a hall sensor.

9. A control method of an electronic parking brake system to reduce noise of the electronic parking brake system, the method comprising:
    determining whether the electronic parking brake system is released;
    controlling voltage applied to a motor to a duty ratio of about 50%~80% when the electronic parking brake system is determined to be released; and
    controlling the voltage applied to the motor to a duty ratio of about 100% if locking of the motor occurs.

* * * * *